(12) United States Patent
Shin

(10) Patent No.: US 10,062,381 B2
(45) Date of Patent: Aug. 28, 2018

(54) METHOD AND ELECTRONIC DEVICE FOR PROVIDING CONTENT

(71) Applicant: Samsung Electronics Co., Ltd., Gyeonggi-do (KR)

(72) Inventor: Sang Min Shin, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/269,406

(22) Filed: Sep. 19, 2016

(65) Prior Publication Data

US 2017/0083281 A1    Mar. 23, 2017

(30) Foreign Application Priority Data

Sep. 18, 2015  (KR) .................. 10-2015-0132488

(51) Int. Cl.
| | | |
|---|---|---|
| *G10L 15/22* | (2006.01) | |
| *G06F 3/16* | (2006.01) | |
| *G10L 25/63* | (2013.01) | |
| *G10L 13/00* | (2006.01) | |
| *G10L 25/03* | (2013.01) | |

(52) U.S. Cl.
CPC .............. *G10L 15/22* (2013.01); *G06F 3/165* (2013.01); *G10L 13/00* (2013.01); *G10L 25/63* (2013.01); *G10L 25/03* (2013.01)

(58) Field of Classification Search
CPC ..................................................... G06F 3/165
See application file for complete search history.

(56) References Cited

U.S. PATENT DOCUMENTS

| | | | |
|---|---|---|---|
| 7,412,378 B2 | 8/2008 | Lewis et al. | |
| 7,684,977 B2 | 3/2010 | Morikawa | |
| 7,848,920 B2 | 12/2010 | Lewis et al. | |
| 7,881,934 B2 | 2/2011 | Endo et al. | |
| 8,928,723 B2 | 1/2015 | Kang et al. | |
| 9,047,054 B1* | 6/2015 | Goldstein | ............... G06F 3/165 |
| 2005/0060158 A1 | 3/2005 | Endo et al. | |
| 2005/0228672 A1 | 10/2005 | Lewis et al. | |
| 2006/0287850 A1* | 12/2006 | Morikawa | ............... G10L 15/22 |
| | | | 704/200 |

(Continued)

FOREIGN PATENT DOCUMENTS

| | | |
|---|---|---|
| JP | 2005-128884 | 5/2005 |
| JP | 2005202076 | 7/2005 |

(Continued)

OTHER PUBLICATIONS

International Search Report dated Nov. 28, 2016 issued in counterpart application No. PCT/KR2016/010196, 12 pages.

(Continued)

*Primary Examiner* — Douglas Godbold
(74) *Attorney, Agent, or Firm* — The Farrell Law Firm, P.C.

(57) ABSTRACT

An electronic device and a method are provided. The electronic device includes an audio input module configured to receive a speech of a user as a voice input, an audio output module configured to output content corresponding to the voice input, and a processor configured to determine an output scheme of the content based on at least one of a speech rate of the speech, a volume of the speech, and a keyword included in the speech, which is obtained from an analysis of the voice input.

20 Claims, 11 Drawing Sheets

(56) References Cited

U.S. PATENT DOCUMENTS

| | | |
|---|---|---|
| 2008/0262837 A1 | 10/2008 | Lewis et al. |
| 2012/0124525 A1 | 5/2012 | Kang |
| 2013/0250034 A1* | 9/2013 | Kang .................. H04W 4/02 348/14.02 |
| 2014/0222432 A1* | 8/2014 | Ahn .................. G10L 15/1822 704/257 |
| 2014/0278395 A1* | 9/2014 | Zurek .................. G10L 15/065 704/233 |
| 2014/0303971 A1* | 10/2014 | Yi .................. H04M 1/605 704/233 |
| 2015/0010169 A1* | 1/2015 | Popova .................. H04S 7/303 381/107 |
| 2016/0104483 A1* | 4/2016 | Foerster .................. G10L 15/02 704/275 |
| 2016/0253146 A1* | 9/2016 | Yang .................. H04N 5/60 381/107 |
| 2016/0379638 A1* | 12/2016 | Basye .................. G06F 17/30764 704/235 |

FOREIGN PATENT DOCUMENTS

| | | |
|---|---|---|
| JP | 2008216735 | 9/2008 |
| KR | 100855563 | 9/2008 |
| KR | 1020130112221 | 10/2013 |

OTHER PUBLICATIONS

European Search Report dated Jun. 20, 2018 issued in counterpart application No. 16846821.3-1207, 13 pages.

* cited by examiner

METHOD AND ELECTRONIC DEVICE FOR PROVIDING CONTENT

PRIORITY

This application claims priority under 35 U.S.C. § 119(a) to a Korean Patent Application filed in the Korean Intellectual Property Office on Sep. 18, 2015 and assigned Serial number 10-2015-0132488, the entire disclosure of which is incorporated herein by reference.

BACKGROUND

1. Field of the Disclosure

The present disclosure relates generally to voice input for an electronic device, and more particularly, to a method and an electronic device for providing content in response to a voice input.

2. Description of the Related Art

Recently, user input interfaces applied to electronic devices have been capable of receiving user input based on voice input in addition to user input based on physical manipulations performed by a user (e.g., an input through a physical keypad, a keyboard, a mouse, or touch panel)

An electronic device that implements a voice input interface receives a user's speech as voice input, converts the voice input into an electrical signal, and provides content to the user based on the converted electrical signal.

Electronic devices that supports voice input interfaces are capable of providing, for example, content to a user by outputting sound (e.g., outputting a voice). However, the user does not share an emotional connection with the electronic device, with respect to the content provided in response to the voice input, because the electronic device provides the content with a uniform speed, a monotonous tone, and a preset volume, regardless of the user's condition while providing the voice input. Furthermore, since the electronic device does not consider nuances according to a form of the user's speech, it is difficult for the electronic device to provide content appropriate for the user's condition.

SUMMARY

An aspect of the present disclosure is to address at least the above-mentioned problems and/or disadvantages and to provide at least the advantages described below. Accordingly, an aspect of the present disclosure is to provide a content providing method that analyzes a voice input of a user's speech and determine an output scheme of content based on the various speech features obtained from results of the analysis and an electronic device performing the same.

In accordance with an aspect of the present disclosure, an electronic device is provided. The electronic device includes an audio input module configured to receive a speech of a user as a voice input, an audio output module configured to output content corresponding to the voice input, and a processor configured to determine an output scheme of the content based on at least one of a speech rate of the speech, a volume of the speech, or a keyword included in the speech, which is obtained from an analysis of the voice input.

In accordance with another aspect of the present disclosure, a content providing method of an electronic device is provided. The method includes receiving a speech of a user as a voice input, determining an output scheme of content based on at least one of a speech rate of the speech, a volume of the speech, or a keyword included in the speech, which is obtained from an analysis of the voice input, and outputting the content corresponding to the voice input based on the determined output scheme.

In accordance with another aspect of the present disclosure, an instruction, which is recorded on a non-transitory computer-readable recording medium and executed by at least one processor, is configured to cause the at least one processor to perform a method. The method includes obtaining a speech of a user as a voice input, determining an output scheme of content based on at least one of a speech rate of the speech, a volume of the speech, or a keyword included in the speech, which is obtained from an analysis of the voice input, and outputting the content corresponding to the voice input based on the determined output scheme.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
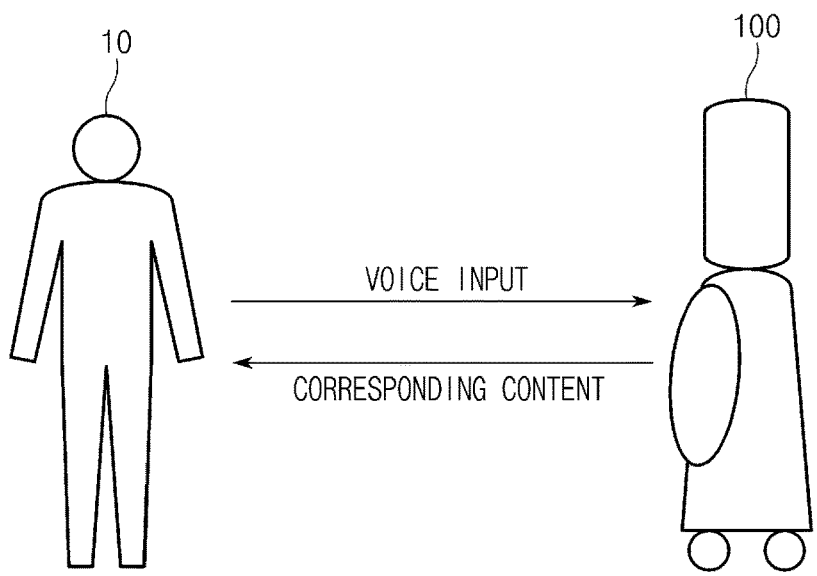
FIGS. 1A and 1B are diagrams illustrating an environment in which an electronic device operates, according to an embodiment of the present disclosure.

Embodiments of the present disclosure may be described with reference to accompanying drawings. Accordingly, those of ordinary skill in the art will recognize that modifications, equivalents, and/or alternatives to the embodiments described herein can be variously made without departing from the scope and spirit of the present disclosure. With regard to description of drawings, similar components may be marked by similar reference numerals.

Herein, the expressions "have", "may have", "include", "comprise", "may include", and "may comprise" indicate the existence of corresponding features (e.g., elements such as numeric values, functions, operations, or components) but do not exclude presence of additional features.

Herein, the expressions "A or B", "at least one of A or/and B", "one or more of A or/and B", and the like may refer to any and all combinations of one or more of the associated listed items. For example, the terms "A or B", "at least one of A and B", and "at least one of A or B" may refer to cases in which at least one A is included, at least one B is included, or both of at least one A and at least one B are included.

The terms, such as "first", "second", and the like, as used herein, may refer to various elements of embodiments of the present disclosure, but do not limit the elements. For example, "a first user device" and "a second user device" indicate different user devices, regardless of the order or priority of the devices. For example, without departing the scope of the present disclosure, a first element may be referred to as a second element, and similarly, a second element may be referred to as a first element.

When an element (e.g., a first element) is referred to as being "(operatively or communicatively) coupled with/to" or "connected to" another element (e.g., a second element), the element may be directly coupled with/to or connected to the other element or an intervening element (e.g., a third element) may be present. By contrast, when an element (e.g., a first element) is referred to as being "directly coupled with/to" or "directly connected to" another element (e.g., a second element), it should be understood that there are no intervening element (e.g., a third element).

Depending on the situation, the expression "configured to", as used herein, may have a definition equivalent to "suitable for", "having the capacity to", "designed to", "adapted to", "made to", or "capable of". The term "configured to" is not limited to being defined as "specifically designed to" with respect to hardware. Instead, the expression "a device configured to" may indicate that the device is "capable of" operating together with another device or other components. For example, a "processor configured to perform A, B, and C" may refer to a dedicated processor (e.g., an embedded processor) for performing a corresponding operation or a generic-purpose processor (e.g., a central processing unit (CPU) or an application processor) that may perform corresponding operations by executing one or more software programs that are stored in a memory device.

Terms used herein are used to describe specified embodiments of the present disclosure and are not intended to limit the scope of the present disclosure. Singular forms of terms may include plural forms unless otherwise specified. Unless otherwise defined herein, all the terms used herein, which include technical or scientific terms, may have the same definition that is generally understood by a person skilled in the art. It will be further understood that terms that are defined in a dictionary and commonly used should also be interpreted according to customary definitions in the relevant related art and not in an idealized or overly formal definitions, unless expressly so defined herein with respect to embodiments of the present disclosure. In some cases, terms that are defined in the specification may not be interpreted in a manner that excludes embodiments of the present disclosure.

An electronic device according to an embodiment of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. The wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or an implantable type (e.g., an implantable circuit).

According to an embodiment of the present disclosure, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles (e.g., Xbox™ and PlayStation™), electronic dictionaries, electronic keys, camcorders, electronic picture frames, and the like.

According to embodiments of the present disclosure, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA) device, a magnetic resonance imaging (MRI) device, a computed tomography (CT) device, scanners, and ultrasonic devices), navigation devices, global navigation satellite system (GNSS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller machines (ATMs), points of sales (POS) devices, or Internet of things (IoT) devices (e.g., light bulbs, various sensors, electric or gas meters, sprinkler devices, fire alarms, thermostats, street lamps, toasters, exercise equipment, hot water tanks, heaters, boilers, and the like).

According to embodiments of the present disclosure, the electronic devices may include at least one of parts of furniture or buildings/structures, electronic boards, electronic signature receiving devices, projectors, or various measuring instruments (e.g., water meters, electricity meters, gas meters, or wave meters, and the like). The electronic device may be one of the above-described devices or a combination thereof. An electronic device may be a flexible electronic device. Furthermore, an electronic device may not be limited to the above-described electronic devices and may include other electronic devices and new electronic devices according to the development of new technologies.

Hereinafter, electronic devices according to embodiments of the present disclosure will be described with reference to the accompanying drawings. The term "user" used herein may refer to a person who uses an electronic device or may refer to a device (e.g., a device implementing an artificial intelligence) that uses an electronic device.

Figure 1B:
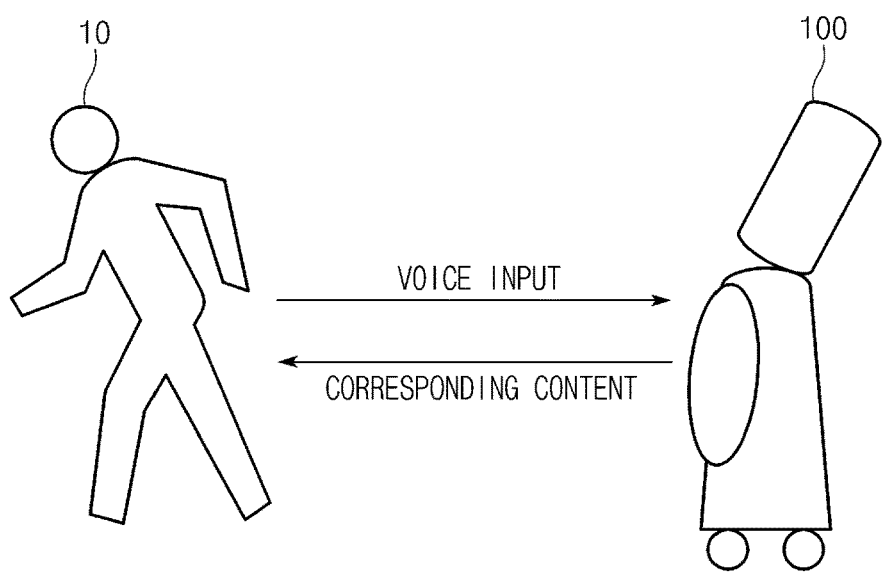

FIGS. 1A and 1B are diagrams illustrating an environment in which an electronic device operates, according to an embodiment of the present disclosure.

Referring to FIG. 1A, a user 10, who is spaced apart from an electronic device 100 by a specific distance and is at a standstill, may speak to the electronic device 100. The speech of the user 10 may be provided to the electronic device 100 as a voice input. For example, the user 10 may speak "Let me know what time it is now." with a moderate volume and at a moderate speech rate, and the speech may be provided to the electronic device 100 as a voice input. The electronic device 100 may receive the voice input through an embedded audio input module (e.g., a microphone) and may generate content corresponding to a result of analyzing the voice input. For example, the electronic device 100 may generate content, such as "The current time is nine ten AM", in response to a voice input, such as "Let me know what time it is now." The electronic device 100 may provide the generated content as sound through an embedded audio output module (e.g., a speaker). In this case, since the user 10 provides a voice input with a moderate volume and at a moderate speech rate at a standstill, the electronic device 100 may provide the content as sound with a moderate output volume level and at a moderate output speed. As such, the user 10 may be provided with the content corresponding to the voice input.

Referring to FIG. 1B, the user 10 who moves away from the electronic device 100 may speak to the electronic device 100. For example, the user 10 may be very busy with getting ready for work. Therefore, for example, the user 10 may make a speech, such as "What time is it now?", with a louder volume than usual and a faster speech rate than usual. The speech may be provided to the electronic device 100 as a voice input.

The electronic device 100 may receive the voice input through the embedded audio input module and may generate content corresponding to a result of analyzing the voice input. For example, the electronic device 100 may generate content, such as "nine ten", in response to the voice input, such as "What time is it now?" The electronic device 100 may provide the generated content as sound through the embedded audio output module. In this case, since the user 10 provides a voice input with a louder volume than usual and at a faster speech rate than usual while the user 10 moves away from the electronic device 100, the electronic device 100 may provide the content as sound with a relatively louder output volume level and at a relatively faster output speed. As such, the user 10 may be provided with content corresponding to a voice input.

Figure 2:
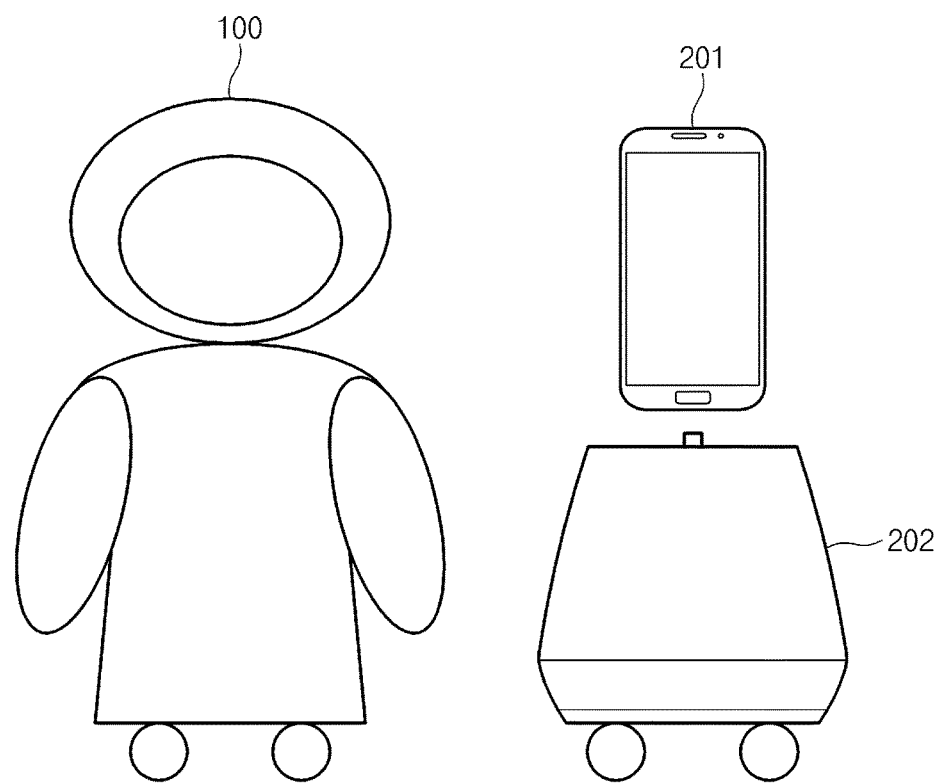
FIG. 2 is a diagram illustrating an electronic device according to an embodiment of the present disclosure.

FIG. 2 is a diagram illustrating an electronic device according to an embodiment of the present disclosure.

Referring to FIG. 2, an electronic device according to an embodiment of the present disclosure may be implemented with the dedicated electronic device 100 that operates inside a house. The dedicated electronic device 100 may include various modules (e.g., elements of FIG. 3) for implementing embodiments according to the present disclosure, such as a driving system that is capable of providing the mobility to the electronic device 100 (e.g., a driving motor, various types of articulated joints for robots (e.g. a bipedal, quadrupedal robot), a wheel, a propeller, and the like), a camera that is capable of recognizing a user, an audio input module that is capable of receiving a voice input, and the like.

Furthermore, the electronic device according to embodiments of the present disclosure may be implemented in a form in which a smartphone 201 and a docking station 202 are coupled to each other. For example, the smartphone 201 may provide a function for implementing embodiments of the present disclosure through various modules (e.g., a processor, a camera, a sensor, and the like) embodied therein. Furthermore, for example, the docking station 202 may include a charging module (and power supplying terminal) that is capable of providing power to the smartphone 201, a driving system that is capable of providing the mobility (e.g., a driving motor, various types of articulated robotic joints, a wheel, a propeller, and the like), a high-power speaker, and the like.

A configuration of the electronic device, which is implementable in various ways as described above, will be described below with reference to FIG. 3. Elements to be described in FIG. 3 may be included, for example, in the electronic device 100 of FIG. 2 or in the smartphone 201 and/or the docking station 202. A content providing method of the electronic device 100 will be described with reference to FIGS. 4 to 8.

Figure 3:
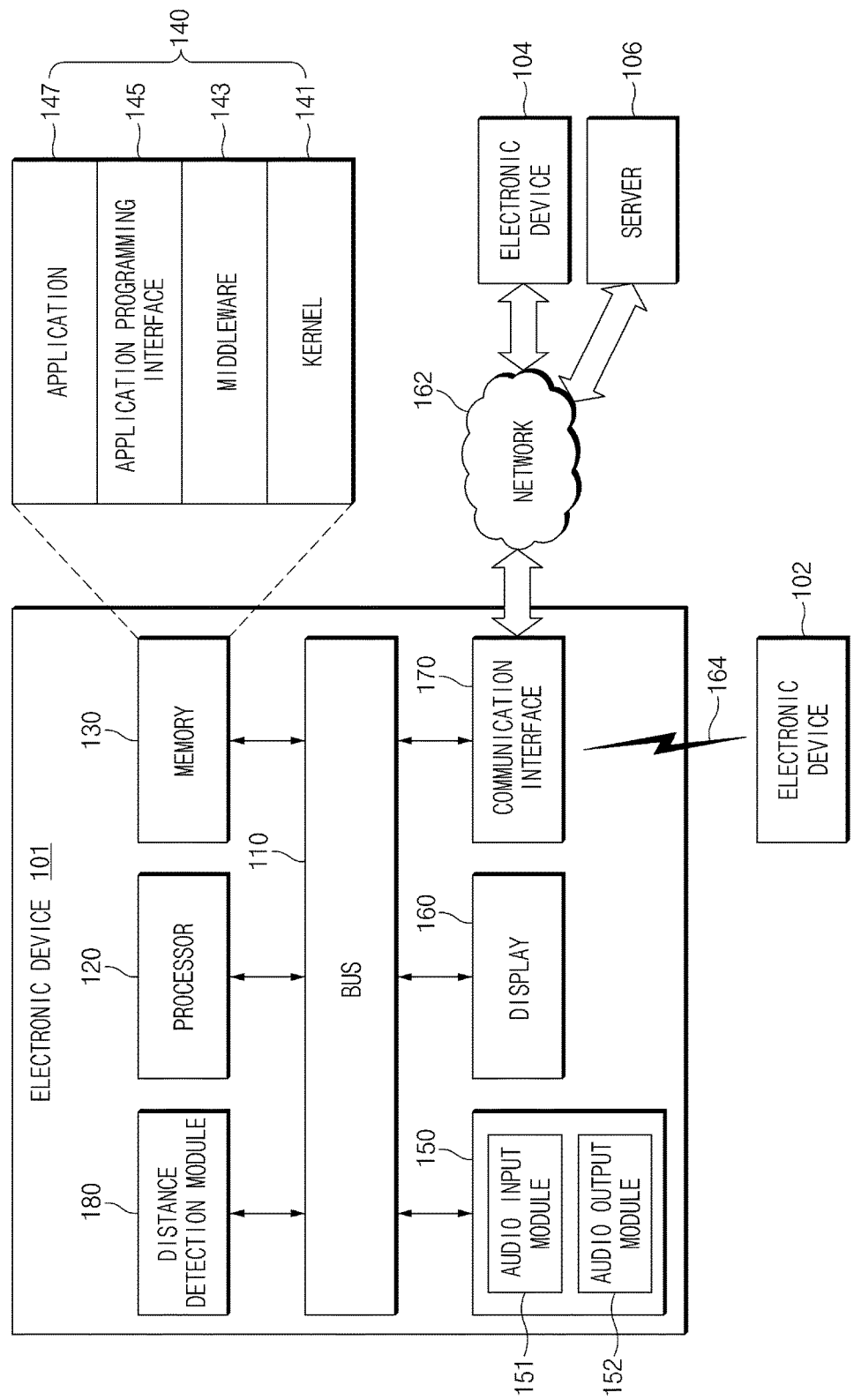
FIG. 3 is a block diagram illustrating an electronic device according to an embodiment of the present disclosure.

FIG. 3 is a block diagram illustrating an electronic device according to an embodiment of the present disclosure.

Referring to FIG. 3, an electronic device 101 according to an embodiment of the present disclosure includes a bus 110, a processor 120, a memory 130, an audio module 150, a display 160, a communication interface 170 and a distance detection module 180. The electronic device 101 may not include at least one of the above-described elements or may further include other element(s). For example, the electronic device 101 may include an input/output interface that provides an instruction or data, which is inputted from a user or another external device, to any other element(s) of the electronic device 101.

For example, the bus 110 may interconnect the above-described elements 110 to 180 and may include a circuit for conveying communications (e.g., a control message and/or data) among the above-described elements.

The processor 120 may include one or more of a central processing unit (CPU), an application processor (AP), or a communication processor (CP). For example, the processor 120 may perform an arithmetic operation or data processing associated with control and/or communication of at least other elements of the electronic device 101. For example, the processor 120 may execute a voice recognition application (e.g., S-Voice) to perform a content providing method according to an embodiment of the present disclosure.

According to embodiments of the present disclosure, the processor 120 may analyze a voice input received through an audio input module 151 and may output content corresponding to the voice input through an audio output module 152 in various schemes. For example, the content may be provided to a user as sound based on a text to speech (TTS) technology.

According to an embodiment of the present disclosure, the processor 120 may determine an output scheme of the content based on at least one of a speech rate of a user's speech, a volume of a user's speech, and a keyword included in the user's speech, which is obtained from an analysis of the voice input. For example, the output scheme may include an output volume level, an output speed, and an output amount of information of the content to be provided as sound.

For example, the output volume level of the content may correspond to a volume level when the content is provided as sound by the audio output module 152. For example, the output speed of the content may correspond to a speed when the content is played back as sound by the audio output module 152. For example, the output amount of information of the content may correspond to an amount of information when the content corresponding to a voice input is provided as sound to a user.

For example, with regard to the output amount of information, the content may be classified into detailed content that includes rich and extended information and abstract content that includes only a gist of the response corresponding to the voice input (a related example is described later herein). The detailed content and the abstract content may be classified dichotomously. However, embodiments of the present disclosure may not be limited thereto. For example, the content may be divided into several levels that range from a format (a format in which the output amount of information is the greatest), in which the content is described most precisely, to a format in which the output amount of information is the least and in which the content is described most simply. For example, the processor 120 may vary or adjust an output amount of information by extracting and reconfiguring a portion of the content that describes the content most precisely. As such, the processor 120 may adaptively generate content that has various amounts of information.

Furthermore, according to embodiments of the present disclosure, the processor 120 may adjust an output speed of content based on an output amount of information of content. For example, as an output amount of information of content to be outputted through the audio output module 152 increases, an output speed of content may also increase under control of the processor 120. For example, an output speed of content may be adjusted depending on a change of the above-described content abbreviation level.

According to embodiments of the present disclosure, the processor 120 may determine an output scheme of corresponding content based on a distance between a user and the electronic device 101. For example, the processor 120 may determine a distance between the user and the electronic device 101 based on at least one of the volume of the user's speech obtained through an analysis of a voice input or the distance computed, calculated, or measured by the distance detection module 180. The processor 120 may adjust at least one of an output volume level of content, an output speed of the content, or an output amount of information of the content based on the determined distance between the user and the electronic device 101.

Furthermore, according to embodiments of the present disclosure, the processor 120 may determine an output scheme of corresponding content based on a rate of movement of a user. For example, the processor 120 may determine a rate of movement of the user based on at least one of the volume of the speech obtained through an analysis of a voice input, a frequency shift of the voice input (e.g., in the case of using Doppler effect), or a fluctuation of the distance computed by the distance detection module 180. A method for determining the rate of movement of the user may not be limited to the above-mentioned embodiment of the present disclosure, and various voice processing technologies for determining the rate of movement of the user may be used. The processor 120 may adjust at least one of an output volume level of content, an output speed of the content, or an output amount of information of the content based on the determined rate of movement of the user.

Furthermore, according to embodiments of the present disclosure, the processor 120 may determine an output scheme of corresponding content based on a speech rate of a user's speech. For example, the processor 120 may adjust at least one of an output speed of content or an output amount of information of the content based on the speech rate of the user's speech obtained through an analysis of a voice input.

Furthermore, according to embodiments of the present disclosure, the processor 120 may determine an output scheme of corresponding content based on a keyword included in a user's speech. For example, if an analysis of a voice input indicates that a designated keyword is included in a user's speech, the processor 120 may adjust at least one of an output speed of content, an output volume level of the content, or an output amount of information of the content.

Furthermore, according to embodiments of the present disclosure, the processor 120 may determine an output scheme of corresponding content based on an emotional status that is determined based on a speech of a user.

Furthermore, according to embodiments of the present disclosure, the processor 120 may adjust an output amount of information of corresponding content based on whether a user has an interest in specific content. For example, when outputting the content corresponding to a voice input, the processor 120 may determine whether a user has an interest in specific content based on whether an additional question (i.e., an additional voice input) associated with the content is received after the initial voice input, a term frequency of the keyword included in the additional question, or the like.

For example, when it is determined that a user has an interest in the specific content, the processor 120 may provide more detailed information by increasing an output amount of information with respect to the content in which the user has an interest. By contrast, for example, the processor 120 may decrease the output amount of information with respect to the content that is determined as content in which the user does not have an interest. That is, the processor 120 of the electronic device 101 may adjust an output amount of information of content based on a user's interest, a user's condition, a context, or the like.

The memory 130 may include a volatile and/or nonvolatile memory. For example, the memory 130 may store instructions or data associated with at least one other element(s) of the electronic device 101. According to an embodiment of the present disclosure, the memory 130 may store software and/or a program 140. The program 140 includes, for example, a kernel 141, a middleware 143, an application programming interface (API) 145, and/or an application program (or an application) 147. At least a part of the kernel 141, the middleware 143, or the API 145 may be called an "operating system (OS)". According to an embodiment of the present disclosure, the application 147 may include a voice recognition application (e.g., S-Voice) that is capable of analyzing a voice input, and generating and/or providing the content corresponding to the voice input.

The audio module 150 includes, for example, the audio input module 151 and the audio output module 152. The audio module 150 may include a driver for driving the audio input module 151 and the audio output module 152 and/or an interface that is connected to an external audio device. The audio input module 151 may be implemented with a microphone and the like, for example. The audio input module 151 may obtain a user's speech as a voice input. The audio output module 152 may be, for example, implemented with a speaker and the like and may output the content corresponding to the voice input as sound.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various content (e.g., a text, an image, a video, an icon, a symbol, and the like) to a user. The display 160 may include a touch screen and may receive, for example, a touch, gesture, proximity, or hovering input using an electronic pen or a part of a user's body.

The communication interface 170 may establish communication between the electronic device 101 and an external device (e.g., a first external electronic device 102, a second external electronic device 104, or a server 106). For example, the communication interface 170 may be connected to a network 162 through wireless communication or wired communication to communicate with the external device (e.g., the second external electronic device 104 or the server 106).

The wireless communication may include at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, a local area network 164. The local area network 164 may include at least one of, for example, a Wi-Fi network, a Bluetooth network, a near field communication (NFC) network, or a global navigation satellite system (GNSS). The GNSS may include at least one of a global positioning system (GPS), a global navigation satellite system (Glonass), Beidou Navigation Satellite System (Beidou), or the European global satellite-based navigation system (Galileo) based on an available region, a bandwidth, or the like. Herein, "GPS" and "GNSS" may be interchangeably used. The wired communication may include at least one of, for example, a universal serial bus (USB), a high definition multimedia interface (HDMI), a recommended standard232 (RS-232), a plain old telephone service (POTS), or the like. The network 162 may include at least one of telecommunications networks, for example, a computer network (e.g., LAN or WAN), an Internet, or a telephone network.

The distance detection module 180 may include a depth camera like a time-of-flight (TOF) camera, a stereo camera computing depth information using triangulation, a charge coupled device (CCD) camera computing a distance through an image processing, or the like. Additionally or alternatively, the distance detection module 180 may include various sensors, such as an infra-red sensor, an RF sensor, an ultrasonic sensor, and the like. The distance detection module 180 may compute a distance between a user and the electronic device based on image data obtained from the cameras or the sensors by using a computing resource of an embedded controller IC. Alternatively, the processor 120 may compute the distance between the user and the electronic device based on image data obtained from the distance detection module 180 by using its computing resource.

Each of the first and second external electronic devices 102 and 104 may be the same or different type of device as that of the electronic device 101. According to an embodiment of the present disclosure, the server 106 may include a group of one or more servers. According to embodiments of the present disclosure, all or a part of operations that the electronic device 101 will perform may be executed by another or plural electronic devices (e.g., the first and second external electronic devices 102 and 104 and the server 106). When the electronic device 101 executes any function or service automatically or in response to a request, the electronic device 101 may not perform the function or the service internally, but, alternatively or additionally, the electronic device 101 may request at least a part of a function associated with the electronic device 101 at other device (e.g., the first external electronic device 102, the second external electronic device 104, or the server 106). The other electronic device (e.g., the first external electronic device 102, the second external electronic device 104, or the server 106) may execute the requested function or an additional function and may provide the execution result to the electronic device 101. The electronic device 101 may provide the requested function or service using the received result or may additionally process the received result to provide the requested function or service. To this end, for example, cloud computing, distributed computing, or client-server computing may be used.

Figure 4:
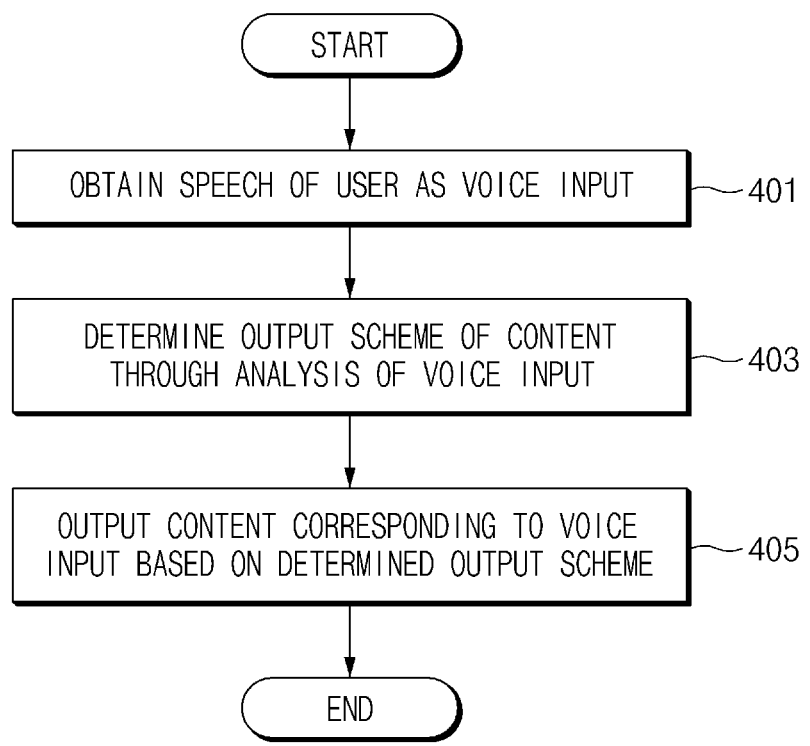
FIG. 4 is a flow chart illustrating a content providing method according to an embodiment of the present disclosure.

FIG. 4 is a flow chart illustrating a content providing method according to an embodiment of the present disclosure.

Referring to FIG. 4, a content providing method according to an embodiment of the present disclosure may include operations 401 to 405. For example, operations 401 to 405 may be performed by the electronic device 101 of FIG. 3.

In operation 401, the electronic device 101 receives a user's speech as a voice input through the audio input module 151.

In operation 403, the electronic device 101 obtains at least one of a speech rate of the speech made by the user, a volume of the speech, and a keyword included in the speech by analyzing the voice input received in operation 401. The electronic device 101 may determine an output scheme of content based on at least one of the speech rate of the speech made by the user, the volume of the speech, or the keyword included in the speech. For example, the output scheme of the content may include adjusting an output volume level of the content, an output speed of the content, or an output amount of information of the content.

In operation 405, the electronic device 101 outputs the content corresponding to the received voice input as sound through the audio output module 152 based on the output scheme determined in operation 403.

Figure 5A:
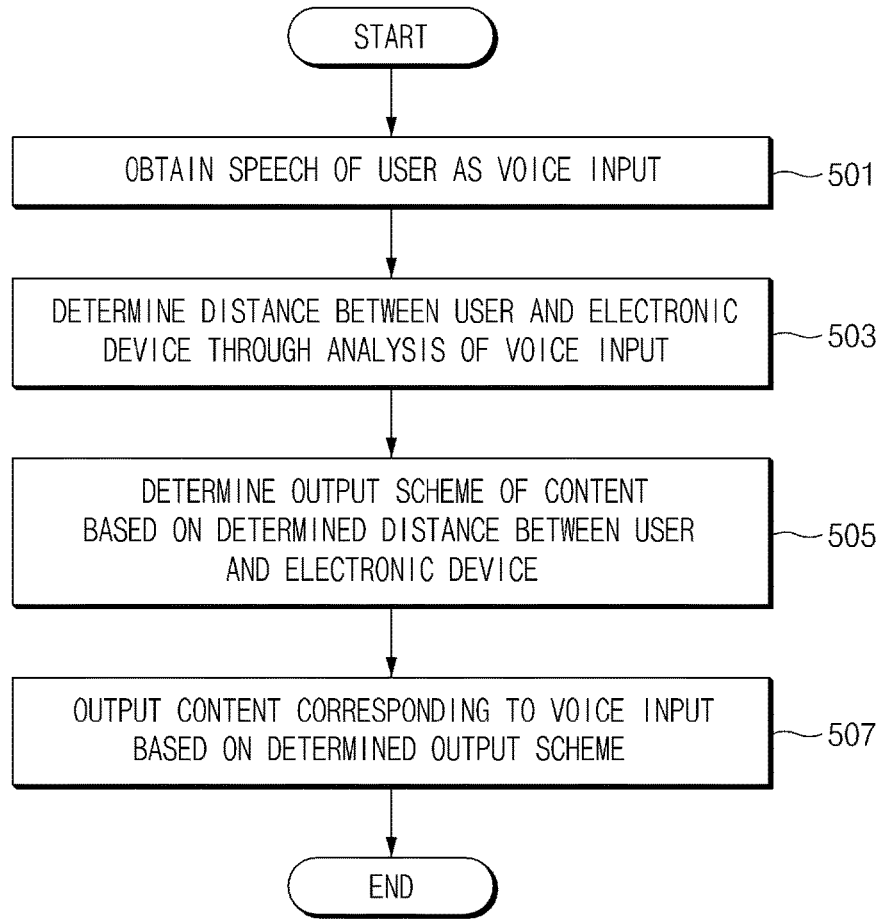
FIG. 5A is a flow chart illustrating a content providing method based on a distance according to an embodiment of the present disclosure.

FIG. 5A is a flow chart illustrating a content providing method according to an embodiment of the present disclosure.

Referring to FIG. 5A, a content providing method according to an embodiment of the present disclosure may include operations 501 to 507. For example, operations 501 to 507 may be performed by the electronic device 101 of FIG. 3.

In operation 501, the electronic device 101 receives a user's speech as a voice input through the audio input module 151. According to embodiments of the present disclosure, in operation 501, the electronic device 101 may measure a distance between the user and the electronic device 101 through the distance detection module 180.

In operation 503, the processor 120 of the electronic device 101 obtains a volume of the speech made by the user by analyzing the voice input received in operation 501 and may determine the distance between the user and the electronic device 101 based on the obtained volume of the speech. For example, the processor 120 of the electronic device 101 may determine the distance by using a database, which is stored in the memory 130 and in which a volume of a user's speech is correlated with a distance between the user and the electronic device 101.

According to embodiments of the present disclosure, the processor 120 of the electronic device 101 may determine a distance between the user and the electronic device 101 based on the distance derived from the volume of the speech and the distance computed by the distance detection module 180. Since the electronic device 101 determines the distance based on both the distance derived from the volume of the speech and the distance computed by the distance detection module 180, the accuracy of the distance measurement may be improved.

In operation 505, the processor 120 of the electronic device 101 determines an output scheme of content based on the distance between the user and the electronic device 101 determined in operation 503.

According to an embodiment of the present disclosure, the processor 120 of the electronic device 101 may determine an output scheme of content such that an output volume level of the corresponding content increases as a distance between the user and the electronic device 101 increases and such that the output volume level of the corresponding content decreases as the distance between the user and the electronic device 101 decreases.

TABLE 1

| Distance (D) between user and electronic device | Output volume level of content |
|---|---|
| D < 1 m | 40 dB |
| 1 m ≤ D < 2 m | 45 dB |
| ... | ... |
| D ≥ 5 m | 65 dB |

For example, as shown in Table 1, the electronic device 101 may set an output volume level of the content to 40 dB when the distance between the user and the electronic device 101 is less than 1 m and may increase the output volume level by 5 dB whenever the distance increases by 1 m. For example, a user who is far away from the electronic device 101 may be provided with corresponding content as sound of a suitable output volume level.

Furthermore, Table 1 is merely provided as an example, but embodiments of the present disclosure are not limited to the example of Table 1. For example, a distance between the user and the electronic device 101 and an output volume level of content according to the distance may be subdivided, and the difference in the output volume level between sections may be diversified.

According to an embodiment of the present disclosure, the processor 120 of the electronic device 101 may determine an output scheme of the content such that an output speed of the content increases as a distance between the user and the electronic device 101 increases and such that the output speed of the content decreases as the distance between the user and the electronic device 101 decreases.

TABLE 2

| Distance (D) between user and electronic device | Output speed of content |
|---|---|
| D < 1 m | 150 WPM |
| 1 m ≤ D < 2 m | 160 WPM |
| 2 m ≤ D < 3 m | 170 WPM |
| ... | ... |
| D ≥ 5 m | 200 WPM |

For example, as shown in Table 2, the electronic device 101 may set an output speed of the content to a standard speed (e.g., 150 word per minute (WPM)) when a distance between the user and the electronic device 101 is less than 1 m and may increase the output speed by 10 WPM whenever the distance increases by 1 m. However, when the distance between the user and the electronic device 101 is at least equal to 5 m, the output speed of the content may not increase above a specific speed (e.g., 200 WPM) even though the distance between the user and the electronic device 101 increases further.

For example, in most cases, a user who requests content with a voice input to the electronic device 101 while being far away from the electronic device 101 may want a quick response. For this reason, the user may be provided with corresponding content as sound of a suitable output speed.

Furthermore, as in Table 1, Table 2 is provided as an example. For example, a distance between the user and the electronic device 101 and an output speed of content according to the distance may be set in more detail.

Furthermore, according to an embodiment of the present disclosure, the processor 120 of the electronic device 101 may determine an output scheme of the content such that an output amount of information of the content decreases as a distance between the user and the electronic device 101 increases and such that the output amount of information of the content increases as the distance between the user and the electronic device 101 decreases.

TABLE 3

| Distance (D) between user and electronic device | Output amount of information of content |
|---|---|
| D < 1 m | Amount of information of original content |
| 1 m ≤ D < 2 m | Content of first abbreviation level |
| 2 m ≤ D < 3 m | Content of second abbreviation level |
| 3 m ≤ D < 4 m | Content of third abbreviation level |
| D ≥ 4 m | Content of fourth abbreviation level (abstract content) |

For example, as shown in Table 3, when a distance between the user and the electronic device 101 is less than 1 m, an output amount of information of the content may be set highest. For example, the content that has the greatest output amount of information may correspond to the most detailed original content corresponding to a voice input. Whenever the distance increases by 1 m, the electronic device 101 may decrease the output amount of information by making the abbreviation level of the original content high.

For example, original content corresponding to a voice input, such as "Let me know today's weather.", may correspond to "The weather in Jul. 1, 2015 is (①) rainy after cloudy (②). The highest temperature is 28° C., and the lowest temperature is 18° C. (③), the rainfall is 10 mm (④). Prepare your umbrella when you go out. (⑤)" In this case, the content of a first abbreviation level may include information of ①, ②, ③, and ④ of the original content while excluding ⑤, and the content of a second abbreviation level may include information of ①, ② and ④ while excluding ③ and ⑤. Furthermore, the content of a third abbreviation level may only include information of ① and ②, and the content of a fourth abbreviation level (abstract content) may only include information of ②. As such, an output amount of information of content may vary or be adjusted by reconfiguring a portion of the original content that describes the content most precisely.

For example, in most cases, a user who requests content with a voice input to the electronic device 101 while being far away from the electronic device 101 may want core content corresponding to the voice input rather than detailed content. For this reason, the user may be provided with corresponding content in a suitable output amount of information based on a distance between the user and the electronic device 101.

Furthermore, embodiments of the present disclosure are not limited to the examples of Table 1, Table 2, and Table 3. For example, a distance between the user and the electronic device 101 may be set in more detail, and an abbreviation level for each distance section may be set in various ways.

In operation 507, the electronic device 101 outputs the content corresponding to the received voice input as sound through the audio output module 152 based on the output scheme determined in operation 505.

Figure 5B:
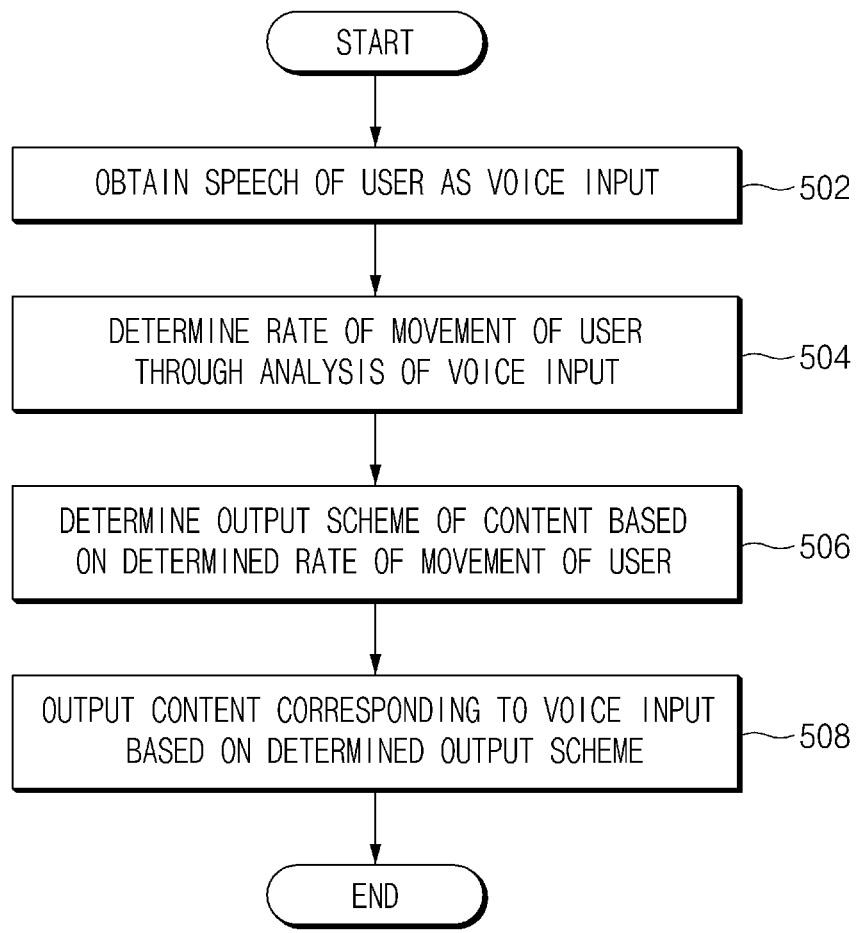
FIG. 5B is a flow chart illustrating a content providing method based on a rate of movement of a user according to an embodiment of the present disclosure.

FIG. 5B is a flow chart illustrating a content providing method according to an embodiment of the present disclosure.

Referring to FIG. 5B, a content providing method according to an embodiment of the present disclosure may include operations 502 to 508. For example, operations 502 to 508 may be performed by the electronic device 101 of FIG. 3.

In operation 502, the electronic device 101 receives a user's speech as a voice input through the audio input module 151. According to embodiments of the present disclosure, in operation 502, the electronic device 101 measures a distance between the user and the electronic device 101 through the distance detection module 180. For example, the distance between the electronic device 101 and the user may be measured in real time according to a specific period.

In operation 504, the processor 120 of the electronic device 101 determines a rate of movement of the user (a distance variation per unit time, i.e., speed or velocity) by analyzing the voice input received in operation 501. For example, the processor 120 may compute a rate of movement based on a frequency fluctuation of the voice input, a volume fluctuation of a speech, and the like or may determine a rate of movement of a user through well-known various voice processing.

According to embodiments of the present disclosure, the processor 120 of the electronic device 101 may determine a rate of movement of the user by analyzing a fluctuation (e.g., a time derivative of the measured distance, and the like) of the distance measured through the distance detection module 180. Furthermore, the processor 120 may determine the rate of movement of the user in consideration of the rate of movement derived from an analysis of the voice input and the rate of movement based on the measured distance. Since the electronic device 101 considers both a rate of movement derived from a voice input and a rate of movement based on the measured distance, a measurement accuracy of a rate of movement may be improved.

In operation 506, the processor 120 determines an output scheme of corresponding content based on the rate of movement of the user determined in operation 504. For example, the processor 120 may adjust at least one of an output volume level of content, an output speed of the content, or an output amount of information of the content based on the determined rate of movement of the user.

According to an embodiment of the present disclosure, the processor 120 of the electronic device 101 may adjust an output volume level of corresponding content based on a direction of a rate of movement of a user (e.g., a direction in which the user moves closer to or away from the electronic device 101) and/or a magnitude of the rate of movement. For example, an output volume level of content according to a rate of movement of a user may correspond to Table 4.

TABLE 4

| Rate of movement of user | Output volume level of content |
|---|---|
| Approaching with speed of 5 km/h or higher | 35 dB |
| Approaching with speed of 2 km/h or higher and less than 5 km/h | 40 dB |
| Approaching with speed of less than 2 km/h | 45 dB |
| 0 km/h (standstill state) | 50 dB |
| Moving away with speed of less than 2 km/h | 55 dB |

TABLE 4-continued

| Rate of movement of user | Output volume level of content |
|---|---|
| Moving away with speed of 2 km/h or higher and less than 5 km/h | 60 dB |
| Moving away with speed of 5 km/h or higher and less than 8 km/h | 65 dB |
| Moving away with speed of 8 km/h or higher | 70 dB |

Referring to Table 4, while a user is at a standstill (i.e., a rate of movement of the user is equal to "0"), the electronic device 101 may set the output volume level of content to 50 dB and may decrease the output volume level as the speed at which the user approaches the electronic device 101 increases. Furthermore, as the speed at which the user moves away from the electronic device 101 increases, the electronic device 101 may increase the output volume level. For example, a user may be provided with corresponding content as sound of a suitable output volume level based on a rate of movement.

Table 4 is provided as an example. For example, a rate of movement of a user and an output volume level of content according to the rate of movement may be set in more detail, and the difference in the output volume level between sections of the rate of movement may be variously set.

Furthermore, according to an embodiment of the present disclosure, the processor 120 of the electronic device 101 may adjust an output volume level of corresponding content based on a direction of a rate of movement of a user (e.g., a direction in which the user moves closer to or away from the electronic device 101) and/or a magnitude of the rate of movement. For example, an output speed of content according to a rate of movement of a user may correspond to Table 5.

TABLE 5

| Rate of movement of user | Output speed of content |
|---|---|
| Approaching with speed of 5 km/h or higher | 135 WPM |
| Approaching with speed of 2 km/h or higher and less than 5 km/h | 140 WPM |
| Approaching with speed of less than 2 km/h | 145 WPM |
| 0 km/h (standstill state) | 150 WPM |
| Moving away with speed of less than 2 km/h | 160 WPM |
| Moving away with speed of 2 km/h or higher and less than 5 km/h | 170 WPM |
| Moving away with speed of 5 km/h or higher and less than 8 km/h | 180 WPM |
| Moving away with speed of 8 km/h or higher | 190 WPM |

For example, as shown in Table 5, while a user is at a standstill (i.e., a rate of movement of the user is equal to "0"), the electronic device 101 may set the output speed of the content to a standard speed (e.g., 150 WPM) and may decrease the output speed as the speed at which the user approaches the electronic device 101 becomes faster. Furthermore, as the speed at which the user moves away from the electronic device 101 becomes faster, the electronic device 101 may increase the output speed. However, when a speed at which the user approaches to the electronic device 101 is at least equal to 5 km/h or when a speed at which the user moves away from the electronic device 101 is at least equal to 8 km/h, the previously decreased/increased output speed may be maintained.

For example, in most cases, a user who requests content with a voice input from the electronic device 101 while quickly moving away from the electronic device 101 may want a quick response. In this case, the user may be provided with corresponding content with an output speed that is appropriate for his/her moving situation.

Furthermore, as in Table 4, Table 5 is provide as an example. For example, an output speed of a user and an output speed of content according to the distance may be set in more detail.

Furthermore, according to an embodiment of the present disclosure, the processor 120 of the electronic device 101 may adjust an output volume level of corresponding content based on a direction of a rate of movement of a user (e.g., a direction in which the user moves closer to or away from the electronic device 101) and/or a magnitude of the rate of movement. For example, an output amount of information of content according to a rate of movement of a user may correspond to Table 6.

TABLE 6

| Rate of movement of user | Output amount of information of content |
|---|---|
| Approaching with speed of 5 km/h or higher | Amount of information of original content |
| Approaching with speed of 2 km/h or higher and less than 5 km/h | Amount of information of original content |
| Approaching with speed of less than 2 km/h | Amount of information of original content |
| 0 km/h (standstill state) | Amount of information of original content |
| Moving away with speed of less than 2 km/h | Content of first abbreviation level |
| Moving away with speed of 2 km/h or higher and less than 5 km/h | Content of second abbreviation level |
| Moving away with speed of 5 km/h or higher and less than 8 km/h | Content of third abbreviation level |
| Moving away with speed of 8 km/h or higher | Content of fourth abbreviation level (abstract content) |

Referring to Table 6, as a rate of movement of a user becomes faster in a direction in which the user moves away from the electronic device 101, an abbreviation level of an output amount of information may increase. That is, if the user moves more rapidly, the user may be provided with content of a higher abbreviation level. By contrast, when a user is at a standstill or when the user moves closer to the electronic device 101, the user may be provided with original content that is not abbreviated at all (the most detailed). As such, an output amount of information of content may vary or be adjusted by reconfiguring a portion of the original content that describes corresponding content most precisely.

For example, in most cases, a user who requests content with a voice input from the electronic device 101 while quickly moving away from the electronic device 101 may want core content rather than detailed content. According to the embodiment of the present disclosure, the electronic device 101 may be capable of providing the user with the content that has an output amount of information appropriate for a moving situation of the user.

Furthermore, as in Table 4 and Table 5, Table 6 is provided as an example. For example, a rate of movement of a user may be set in more detail, and the abbreviation level for each speed section may be set in various ways.

In operation 508, the electronic device 101 outputs the content corresponding to the received voice input as sound through the audio output module 152 based on the output scheme determined in operation 506.

Figure 6:
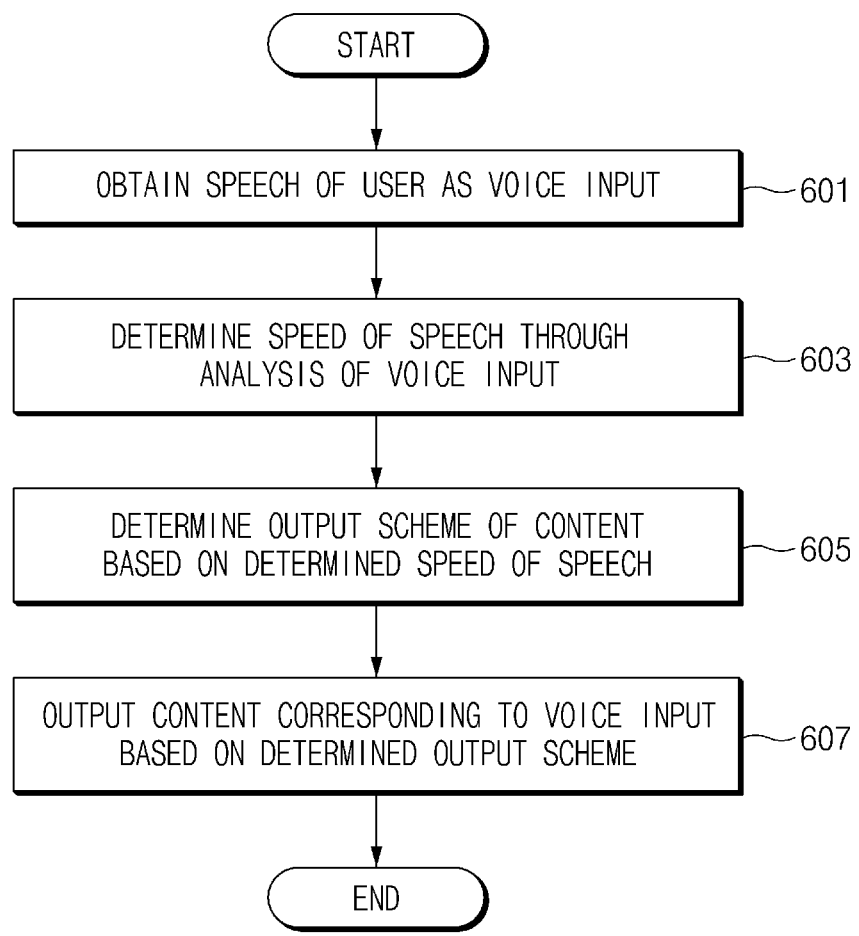
FIG. 6 is a flow chart illustrating a content providing method based on a speech rate of a user's speech according to an embodiment of the present disclosure.

FIG. 6 is a flow chart illustrating a content providing method according to an embodiment of the present disclosure.

Referring to FIG. 6, a content providing method according to an embodiment of the present disclosure may include operations 601 to 607. For example, operations 601 to 607 may be performed by the electronic device 101 of FIG. 3.

In operation 601, the electronic device 101 receives a user's speech as a voice input through the audio input module 151.

In operation 603, the processor 120 of the electronic device 101 obtains a speech rate of the speech made by the user by analyzing the voice input received in operation 601. For example, the speech rate of the speech may correspond to a recognition speech rate of the word recognized by applying speech-to-text (STT) technology to a voice input.

In operation 605, the processor 120 of the electronic device 101 determines an output scheme of content based on the speech rate of the user's speech determined in operation 603.

According to an embodiment of the present disclosure, the processor 120 of the electronic device 101 may determine an output scheme of the content such that an output speed of corresponding content increases as the speech rate of the speech made by the user increases and such that the output speed of the corresponding content decreases as the speech rate of the speech decreases.

TABLE 7

| Speech Rate (S) of speech of user | Output speed of content |
|---|---|
| S < 150 WPM | 150 WPM |
| 150 WPM ≤ S < 160 WPM | 160 WPM |
| 160 WPM ≤ S < 170 WPM | 170 WPM |
| . . . | . . . |
| 240 WPM ≤ S < 250 WPM | 250 WPM |
| S ≥ 250 WPM | 250 WPM |

For example, as shown in Table 7, when the speech rate of the speech made by the user is less than 150 WPM, the electronic device 101 may set an output speed of content to 150 WPM. As the speech rate of the speech made by the user increases, the electronic device 101 may increase the output speed of the content by 10 WPM for each 10 WPM section. However, if the speech rate of the speech made by the user is faster than a specific speech rate (e.g., 250 WPM), the electronic device 101 may not proportionally increase the output speed of the content even though the speech rate of the speech made by the user further increases. With this method, a user who provides a voice input with respect to the electronic device 101 may be provided with corresponding content as sound of a suitable output speed.

Table 7 is merely provided as an example, but embodiments of the present disclosure are not limited to the example of Table 7. For example, an output speed of the content may be set to continuously increase in proportion of the speech rate of the user's speech. Furthermore, a section of the speech rate of the user's speech and an output speed of the content corresponding to this may be set in more detail, and the output speed for each section may be variously set.

Furthermore, according to an embodiment of the present disclosure, the processor 120 of the electronic device 101 may determine an output scheme of the content such that the output amount of information of the content decreases as the speech rate of the speech made by the user increases and such that the output amount of information of the content increases as the speech rate of the speech decreases.

TABLE 8

| Speed (S) of speech of user | Output amount of information of content |
|---|---|
| S < 170 WPM | Amount of information of original content |
| 170 WPM ≤ S < 190 WPM | Amount of information of content of first abbreviation level |
| 190 WPM ≤ S < 210 WPM | Amount of information of content of second abbreviation level |
| 210 WPM ≤ S < 230 WPM | Amount of information of content of third abbreviation level |
| S ≥ 230 WPM | Amount of information of content of fourth abbreviation level |

For example, as shown in Table 8, when the speech rate of the user's speech is less than 170 WPM, the output amount of information of the content may be set highest. For example, content that has the greatest output amount of information may correspond to the most detailed original content corresponding to a voice input. Whenever the speech rate of the speech increases by 20 WPM, the electronic device 101 may decrease the output amount of information by making the abbreviation level of the original content high.

A user who requests content with a fast speech rate of a speech with respect to the electronic device 101 may correspond to a user who wants to be provided with core content fast. In this case, the electronic device 101 may provide corresponding content that has a suitable output amount of information in response to the user's intention.

Furthermore, embodiments of the present disclosure are not limited to the example of Table 8. For example, a distance between the user and the electronic device 101 may be set in more detail, and the abbreviation level for each section may be set in various ways.

In operation 607, the electronic device 101 outputs the content corresponding to the received voice input as sound through the audio output module 152 based on the output scheme determined in operation 605.

Figure 7:
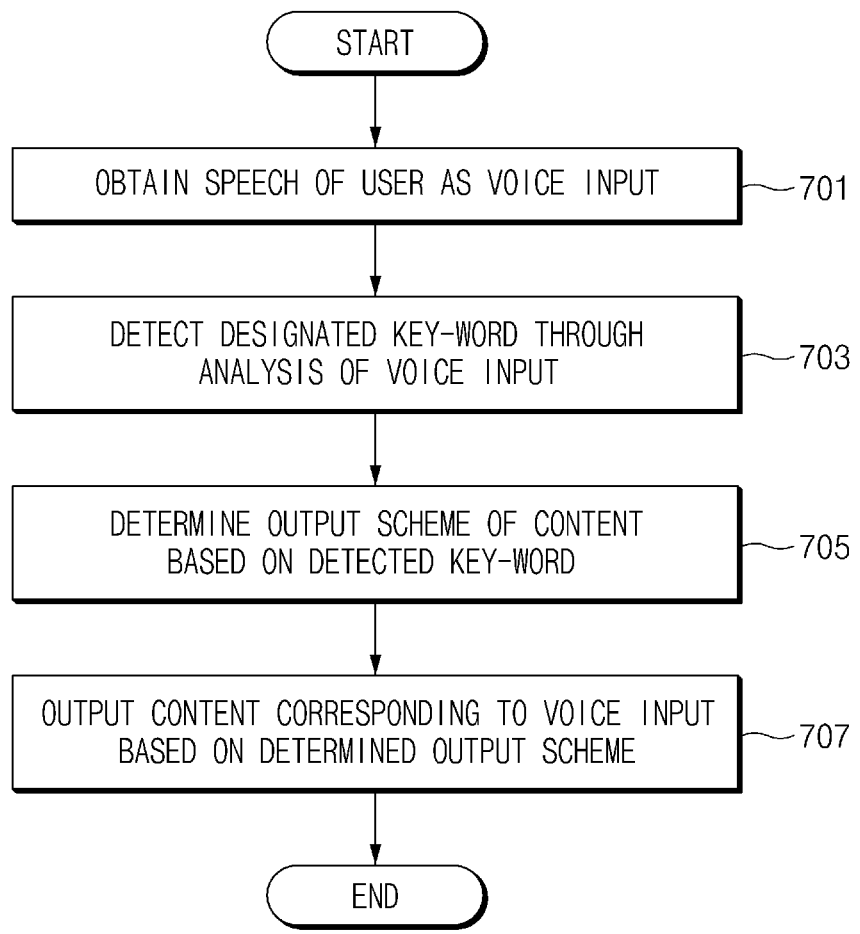
FIG. 7 is a flow chart illustrating a content providing method based on a keyword according to an embodiment of the present disclosure.

FIG. 7 is a flow chart illustrating a content providing method according to an embodiment of the present disclosure.

Referring to FIG. 7, a content providing method according to an embodiment of the present disclosure may include operations 701 to 707. For example, operations 701 to 707 may be performed by the electronic device 101 of FIG. 3.

In operation 701, the electronic device 101 receives a user's speech as a voice input through the audio input module 151.

In operation 703, the processor 120 of the electronic device 101 detects a designated keyword from the speech made by the user by analyzing the voice input received in operation 701. For example, a speech rate of the speech may correspond to a recognition speech rate of the word recognized through an analysis of a voice input.

In operation 705, the processor 120 of the electronic device 101 determines an output scheme of content based on the keyword detected in operation 703.

For example, if a designated first keyword is included in a user's speech, the processor 120 may increase an output speed of the content. If a second keyword is included, the processor 120 may decrease the output speed of the content. Furthermore, for example, if a designated third keyword is included in the speech of the user, the processor 120 may increase an output volume level of the content. If a fourth keyword is included, the processor 120 may decrease the output volume level of the content. Furthermore, for example, if a designated fifth keyword is included in the speech of the user, the processor 120 may increase an output amount of information of the content. If a designated sixth keyword is included, the processor 120 may decrease the output amount of information of the content.

TABLE 9

| Designated keyword | Output scheme of content |
|---|---|
| First keyword: "quickly" "promptly" "immediately" and the like | Increase output speed of content |
| Second keyword: "slowly" "leisurely" and the like | Decrease output speed of content |
| Third keyword: "loudly" "aloud" and the like | Increase output volume level of content |
| Fourth keyword: "quietly" "softly" and the like | Decrease output volume level of content |
| Fifth keyword: "minutely" "deeply" and the like | Increase output amount of information of content |
| Sixth keyword: "briefly" "concisely" and the like | Decrease output amount of information of content |

Table 9 is an example in which the first to sixth keywords correspond to various content output schemes. Through the keywords as described above, a user who provides a voice input with respect to the electronic device 101 may be provided with corresponding content as sound with an output scheme according with the intention.

The correspondence between the first to sixth keywords and content output schemes, which is described in Table 9, may be, but is not limited to, an example. For example, the first to sixth keywords may include a variety of analogous terms in addition to the proposed keywords, and the output scheme may also be set in various ways. According to an embodiment of the present disclosure, the first to sixth keywords may be designated by a user in advance or may be automatically set through machine learning using pattern recognition. Furthermore, the first to sixth keywords may be implemented with a phrase or a sentence, but are not limited to a word.

In operation 707, the electronic device 101 outputs the content corresponding to the received voice input as sound through the audio output module 152 based on the output scheme determined in operation 705.

Figure 8:
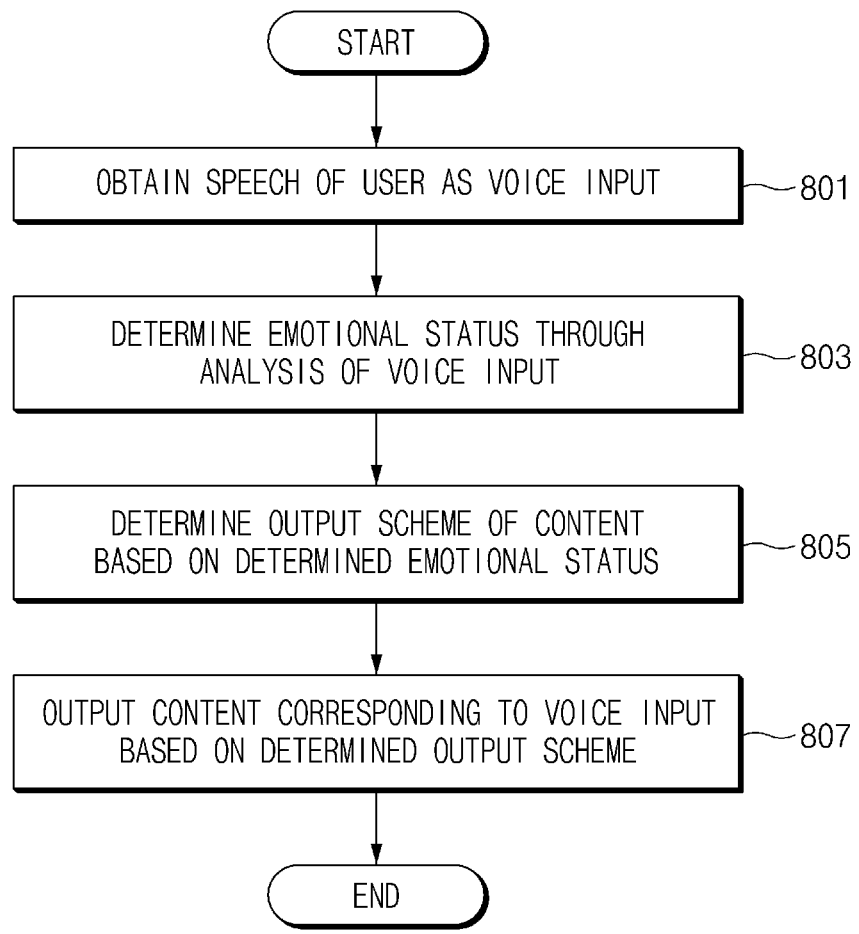
FIG. 8 is a flow chart illustrating a content providing method based on an emotional status of a user according to an embodiment of the present disclosure.

FIG. 8 is a flow chart illustrating a content providing method according to an embodiment of the present disclosure.

Referring to FIG. 8, a content providing method according to an embodiment of the present disclosure may include operations 801 to 807. For example, operations 801 to 807 may be performed by the electronic device 101 of FIG. 3.

In operation 801, the electronic device 101 receives a user's speech as a voice input through the audio input module 151.

In operation 803, the processor 120 of the electronic device 101 determines an emotional status of the user by analyzing the voice input received in operation 801. There may be various methods for determining an emotional status by analyzing the voice input.

For example, an emotional status of a user may be determined by applying a support vector machine (SVM) pattern classifier to a characteristic vector based on characteristics (e.g., energy, formant, tempo, duration, frequency jitter, amplitude shimmer, and the like) extracted from a voice input signal. Generally, the emotional status may be classified into six kinds of emotions, that is, angry, bored, happy, neutral, sad, and surprised.

In addition to the above-described emotions, an emotional status of a user may be determined according to at least one of a speech rate of a user's speech, a volume of the speech, and a keyword included in the speech. For example, if a speech rate of a user's speech becomes greater than a specific speech rate and if a volume of the speech becomes greater than a specific volume, the processor 120 may determine an emotional status of the user as an "excited" state. The emotional status may be automatically set through machine learning using pattern recognition. For example, in determining a state of "excited" or "non-excited (normal)", the specific speech rate of the speech and/or the specific volume of the speech may be automatically set through a data history accumulated over a period of time.

In operation 805, the processor 120 of the electronic device 101 determines an output scheme of content based on the emotional status of the user determined in operation 803. For example, the processor 120 may adjust an output speed, an output volume level, or an output amount of information of the most appropriate content in response to the emotional status of the user determined in operation 803.

In operation 807, the electronic device 101 outputs the content corresponding to the received voice input as sound through the audio output module 152 based on the output scheme determined in operation 805.

Even though respective operations described in FIGS. 4 to 8 are independently described, according to embodiments of the present disclosure, a portion of or all the operations may be combined in various ways and may be performed at the same time or at a different time. As such, the electronic device 101 may provide corresponding content in an output scheme that is most appropriate for a condition of a user who performs a voice input.

According to an embodiment of the present disclosure, it may be possible to effectively provide content corresponding to a voice input by analyzing the voice input of a speech made by the user. Besides, a variety of effects directly or indirectly understood through the present disclosure may be provided.

Figure 9:
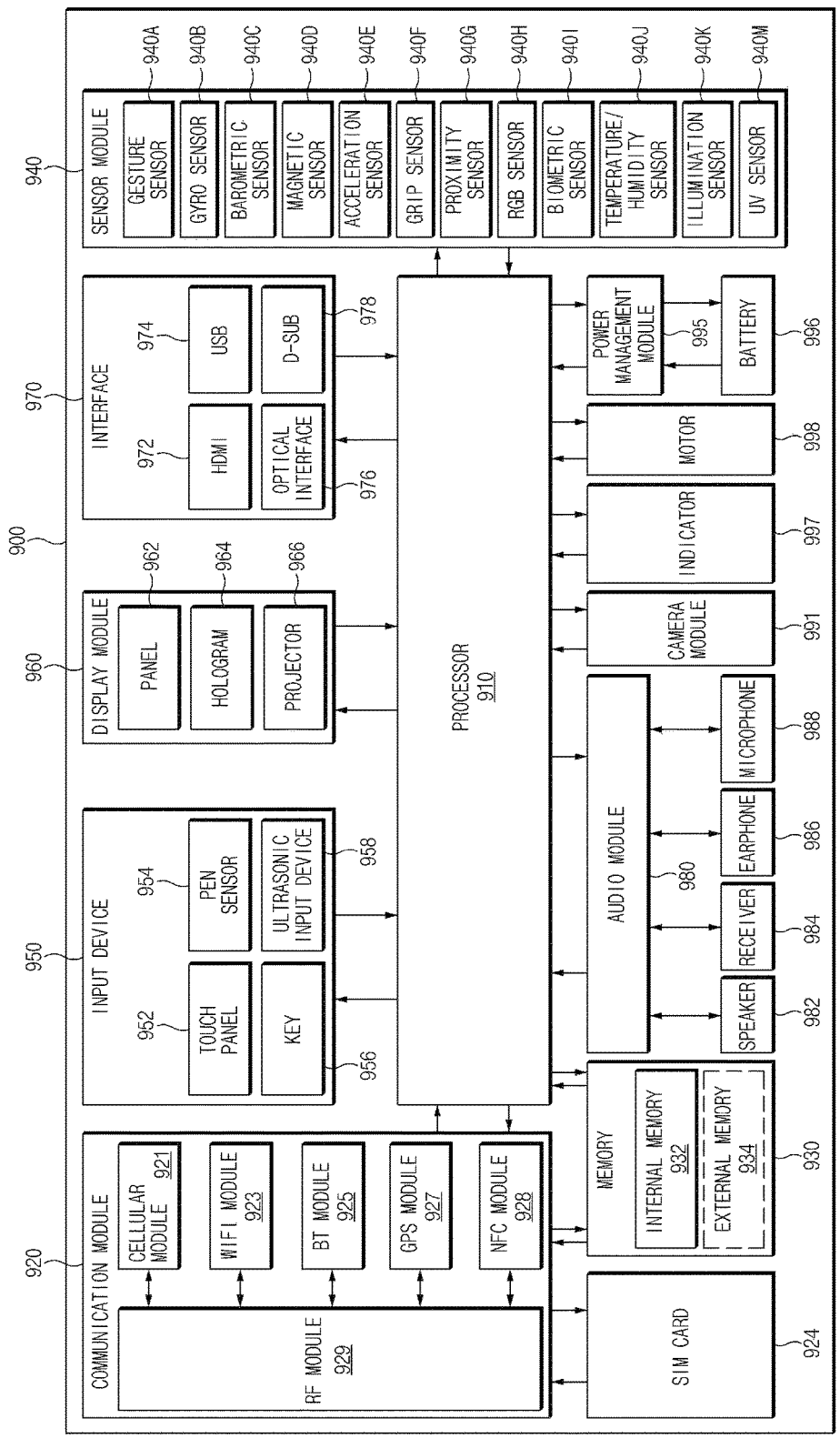
FIG. 9 is a block diagram illustrating an electronic device according to embodiments of the present disclosure.

FIG. 9 is a block diagram of an electronic device according to an embodiment of the present disclosure.

Referring to FIG. 9, an electronic device 901 may include, for example, all or a part of an electronic device 901 illustrated in FIG. 9. All or a part of the electronic device 901 may be included in the electronic device 100 illustrated in FIG. 1a, FIG. 1b, or FIG. 2, or the smartphone 201. Also, all or a part of the electronic device 901 may be included in the electronic device 101.

The electronic device 901 includes one or more processors (e.g., an AP) 910, a communication module 920, a subscriber identification module 924, a memory 930, a sensor module 940, an input device 950, a display module 960, an interface 970, an audio module 980, a camera module 991, a power management module 995, a battery 996, an indicator 997, and a motor 998.

The processor 910 may drive an operating system (OS) or an application to control a plurality of hardware or software components connected to the processor 910 and may process and compute a variety of data. The processor 910 may be implemented with a System on Chip (SoC), for example. According to an embodiment of the present disclosure, the processor 910 may further include a graphic processing unit (GPU) and/or an image signal processor. The processor 910 may include at least a part (e.g., a cellular module 921) of components illustrated in FIG. 9. The processor 910 may load and process an instruction or data, which is received from at least one of other components (e.g., a nonvolatile memory), and may store a variety of data at a nonvolatile memory.

The communication module 920 may be configured the same as or similar to a communication interface 970 of FIG. 9. The communication module 920 includes a cellular module 921, a Wi-Fi module 923, a Bluetooth (BT) module 925, a GNSS module 927 (e.g., a GPS module, a Glonass module, a Beidou module, or a Galileo module), a near field communication (NFC) module 928, and a radio frequency (RF) module 929.

The cellular module 921 may provide voice communication, video communication, a character service, an Internet service, or the like through a communication network. According to an embodiment of the present disclosure, the cellular module 921 may perform discrimination and authentication of the electronic device 901 within a communication network using the subscriber identification module 924 (e.g., a SIM card), for example. The cellular module 921 may perform at least a part of functions that the processor 910 provides. The cellular module 921 may include a communication processor (CP).

Each of the Wi-Fi module 923, the BT module 925, the GNSS module 927, and the NFC module 928 may include a processor for processing data exchanged through a corresponding module, for example. According to an embodiment of the present disclosure, at least a part (e.g., two or more components) of the cellular module 921, the Wi-Fi module 923, the BT module 925, the GPS module 927, and the NFC module 928 may be included within one Integrated Circuit (IC) or an IC package.

The RF module 929 may transmit and receive data, for example, a communication signal (e.g., an RF signal). The RF module 929 may include a transceiver, a power amplifier module (PAM), a frequency filter, a low noise amplifier (LNA), an antenna, or the like. According to embodiments of the present disclosure, at least one of the cellular module 921, the Wi-Fi module 923, the BT module 925, the GNSS module 927, or the NFC module 928 may transmit and receive an RF signal through a separate RF module.

The subscriber identification module 924 may include unique identify information (e.g., integrated circuit card identifier (ICCID)) or subscriber information (e.g., integrated mobile subscriber identity (IMSI)).

The memory 930 (e.g., the memory 130 in FIG. 3) includes an internal memory 932 and an external memory 934. For example, the embedded memory 932 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard drive, or a solid state drive (SSD).

The external memory 934 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 934 may be functionally and/or physically connected to the electronic device 901 through various interfaces.

The sensor module 940 may measure, for example, a physical quantity or may detect an operation state of the electronic device 901. The sensor module 940 may convert the measured or detected information to an electric signal. For example, the sensor module 940 may include at least one of a gesture sensor 940A, a gyro sensor 940B, a pressure sensor 940C, a magnetic sensor 940D, an acceleration sensor 940E, a grip sensor 940F, a proximity sensor 940G, a red, green, blue (RGB) sensor 940H, a living body sensor 940I, a temperature/humidity sensor 940J, an illuminance sensor 940K, or an UV sensor 940M. The sensor module 940 may further include, for example, an E-nose sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, a fingerprint sensor, and the like. The sensor module 940 may further include a control circuit for controlling at least one or more sensors included therein. According to an embodiment of the present disclosure, the electronic device 901 may further include a processor which is a part of the processor 910 or independent of the processor 910 and is configured to control the sensor module 940. The processor may control the sensor module 940 while the processor 910 remains at a sleep state.

The input device 950 includes a touch panel 952, a (digital) pen sensor 954, a key 956, and an ultrasonic input unit 958. The touch panel 952 may use at least one of capacitive, resistive, infrared and ultrasonic detecting methods. Also, the touch panel 952 may further include a control circuit. The touch panel 952 may further include a tactile layer to provide a tactile reaction to a user.

The (digital) pen sensor 954 may be, for example, a part of a touch panel or may include an additional sheet for recognition. The key 956 may include, for example, a physical button, an optical key, a keypad, and the like. The ultrasonic input device 958 may detect (or sense) an ultrasonic signal, which is generated from an input device, through a microphone 988 and may make sure of data corresponding to the detected ultrasonic signal.

The display 960 (e.g., a display 160 in FIG. 3) includes a panel 962, a hologram device 964, and a projector 966. The panel 962 may be configured to be the same as or similar to a display 160 illustrated in FIG. 3. The panel 962 may be implemented to be flexible, transparent or wearable, for example. The panel 962 and the touch panel 952 may be integrated into a single module. The hologram device 964 may display a stereoscopic image in a space using a light interference phenomenon. The projector 966 may project light onto a screen so as to display an image. The screen may be arranged in the inside or the outside of the electronic device 901. According to an embodiment of the present disclosure, the display 960 may further include a control circuit for controlling the panel 962, the hologram device 964, or the projector 966.

The interface 970 includes, for example, a high-definition multimedia interface (HDMI) 972, a universal serial bus (USB) 974, an optical interface 976, and a D-subminiature (D-sub) 978. The interface 970 may be included, for example, in the communication interface 970 illustrated in FIG. 9. The interface 970 may include, for example, a mobile high definition link (MHL) interface, a SD card/multi-media card (MMC) interface, or an infrared data association (IrDA) standard interface.

The audio module 980 may convert a sound and an electric signal in dual directions. At least a part of the audio module 980 may be included, for example, in an input/output interface 950 illustrated in FIG. 9. The audio module 980 may process, for example, sound information that is inputted or outputted through a speaker 982, a receiver 984, an earphone 986, or the microphone 988.

The camera module 991 for shooting a still image or a video may include, for example, at least one image sensor (e.g., a front sensor or a rear sensor), a lens, an image signal processor (ISP), or a flash (e.g., an LED or a xenon lamp).

The power management module 995 may manage, for example, power of the electronic device 901. According to an embodiment of the present disclosure, a power management integrated circuit (PMIC), a charger IC, or a battery gauge may be included in the power management module 995. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 996 and a voltage, current or temperature thereof while the battery is charged. The battery 996 may include, for example, a rechargeable battery and/or a solar battery.

The indicator 997 may display a specific state of the electronic device 901 or a part thereof (e.g., the processor 120 in FIG. 3), such as a booting state, a message state, a charging state, and the like. The motor 998 may convert an electrical signal into a mechanical vibration and may generate the following effects: vibration, haptic, and the like. A processing device (e.g., a GPU) for supporting a mobile TV may be included in the electronic device 901. The processing device for supporting a mobile TV may process media data according to the standards of digital multimedia broadcasting (DMB), digital video broadcasting (DVB), MediaFlo™, or the like.

Each of the above-described elements of electronic devices according to embodiments of the present disclosure may be configured with one or more components, and the names of the elements may be changed according to the type of the electronic device. Electronic devices according to embodiments of the present disclosure may include at least one of the above-mentioned elements, and some elements may be omitted or other additional elements may be added. Furthermore, some of the elements of electronic devices according to embodiments of the present disclosure may be combined with each other so as to form a single entity that performs the functions of the individual elements in the same manner as before the combination.

Figure 10:
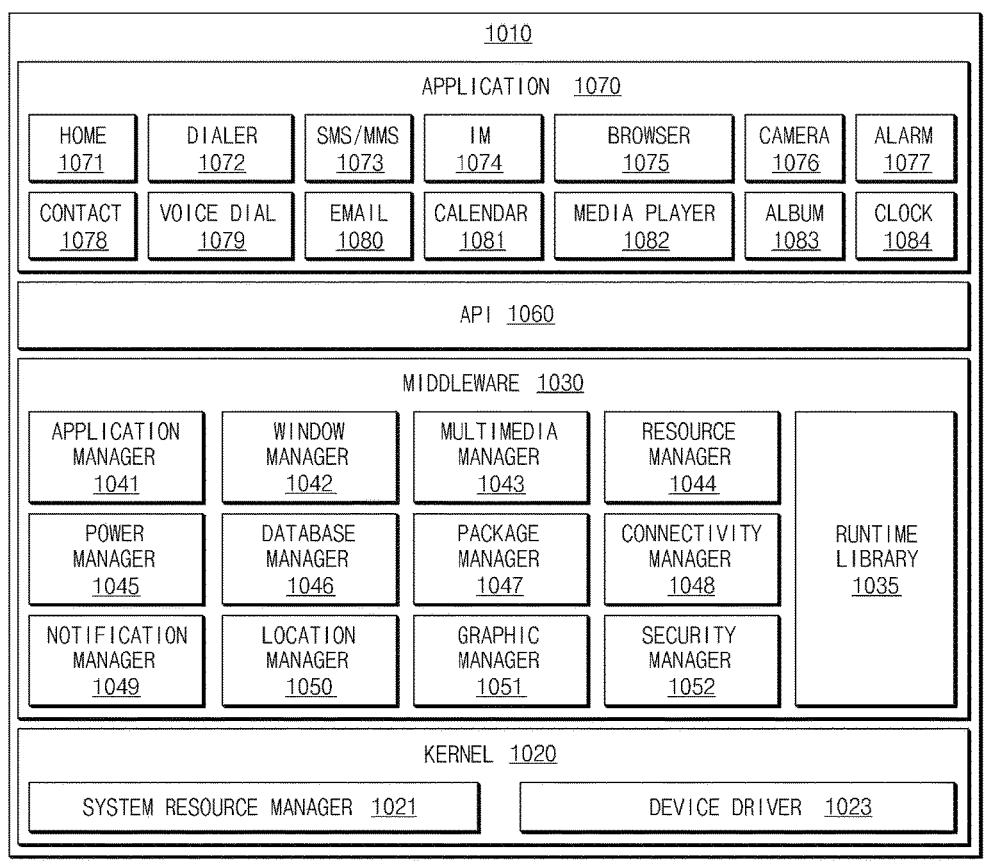
FIG. 10 is a block diagram illustrating a program module according to embodiments of the present disclosure.

FIG. 10 is a block diagram illustrating a program module according to an embodiment of the present disclosure.

Referring to FIG. 10, according to an embodiment of the present disclosure, a program module 1010 (e.g., a program 140 in FIG. 3) may include an operating system (OS) to control resources associated with the electronic device 101 in FIG. 3, and/or diverse applications (e.g., an application program 947) driven on the OS. The OS may be, for example, Android™, iOS™, Windows™, Symbian™, Tizen™, or Bada™.

The program module 1010 may include a kernel 1020, a middleware 1030, an application programming interface (API) 1060, and/or an application 1070. At least a part of the program module 1010 may be preloaded on an electronic device or may be downloadable from the first external electronic device 102, the second external electronic device 104, a server 106 in FIG. 3, and the like.

The kernel 1020 (e.g., a kernel 141 in FIG. 3) includes, for example, a system resource manager 1021 or a device driver 1023. The system resource manager 1021 may perform control, allocation, or retrieval of system resources. According to an embodiment of the present disclosure, the system resource manager 1021 may include a process managing part, a memory managing part, or a file system managing part. The device driver 1023 may include, for example, a display driver, a camera driver, a Bluetooth driver, a common memory driver, an USB driver, a keypad driver, a Wi-Fi driver, an audio driver, or an inter-process communication (IPC) driver.

The middleware 1030 may provide, for example, a function which the application 1070 needs in common, or may provide diverse functions to the application 1070 through the API 1060 to allow the application 1070 to efficiently use limited system resources of the electronic device. According to an embodiment of the present disclosure, the middleware 1030 (e.g., a middleware 43 in FIG. 3) includes, for example, a runtime library 1035, an application manager 1041, a window manager 1042, a multimedia manager 1043, a resource manager 1044, a power manager 1045, a database manager 1046, a package manager 1047, a connectivity manager 1048, a notification manager 1049, a location manager 1050, a graphic manager 1051, and a security manager 1052.

The runtime library 1035 may include, for example, a library module which is used by a compiler to add a new function through a programming language while the application 1070 is being executed. The runtime library 1035 may perform input/output management, memory management, or capacities about arithmetic functions.

The application manager 1041 may manage, for example, a life cycle of at least one application of the application 1070. The window manager 1042 may manage a GUI resource which is used in a screen. The multimedia manager 1043 may identify a format necessary for playing diverse media files, and may perform encoding or decoding of media files by using a codec suitable for the format. The resource manager 1044 may manage resources such as a storage space, memory, or source code of at least one application of the application 1070.

The power manager 1045 may operate, for example, with a basic input/output system (BIOS) to manage a battery or power, and may provide power information for an operation of an electronic device. The database manager 1046 may generate, search for, or modify database which is to be used in at least one application of the application 1070. The package manager 1047 may install or update an application which is distributed in the form of package file.

The connectivity manager 1048 may manage, for example, wireless connection such as Wi-Fi or Bluetooth. The notification manager 1049 may display or notify an event such as arrival message, promise, or proximity notification in a mode that does not disturb a user. The location manager 1050 may manage location information of an electronic device. The graphic manager 1051 may manage a graphic effect that is provided to a user, or manage a user interface relevant thereto. The security manager 1052 may provide a general security function necessary for system security or user authentication. According to an embodiment of the present disclosure, when an electronic device 101 includes a telephony function, the middleware 1030 may further includes a telephony manager for managing a voice or video call function of the electronic device.

The middleware 1030 may include a middleware module that combines diverse functions of the above-described components. The middleware 1030 may provide a module specialized to each OS kind to provide differentiated functions. Additionally, the middleware 1030 may remove a part of the preexisting components, dynamically, or may add a new component thereto.

The API 1060 (e.g., the API 145 in FIG. 3) may be, for example, a set of programming functions and may be provided with a configuration which is variable depending on an OS. For example, when an OS operating in a device is Android™ or iOS™, it may be permissible to provide one API set per platform. When an OS operating in a device is Tizen™, it may be permissible to provide two or more API sets per platform.

The application 1070 (e.g., the application program 147 in FIG. 3) may include, for example, one or more applications capable of providing functions for a home 1071, a dialer 1072, an SMS/MMS 1073, an instant message (IM) 1074, a browser 1075, a camera 1076, an alarm 1077, a contact 1078, a voice dial 1079, an e-mail 1080, a calendar 1081, a media player 1082, am album 1083, and a timepiece 1084, or for offering health care (e.g., measuring an amount of exercise or blood sugar level) or environment information (e.g., atmospheric pressure, humidity, or temperature).

According to an embodiment of the present disclosure, the application 1070 may include an information exchanging application to support information exchange between the electronic device 101 and the first external electronic device 102, or the second external electronic device 104. The information exchanging application may include, for example, a notification relay application for transmitting specific information to the external electronic device, or a device management application for managing the external electronic device.

For example, the information exchanging application may include a function of transmitting notification information, which arise from other applications (e.g., applications for SMS/MMS, e-mail, health care, or environmental information), to the first external electronic device 102 or the second external electronic device 104. Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the first external electronic device 102 or the second external electronic device 104, which communicates with the electronic device, an application running in the external electronic device, or a service (e.g., a call service, a message service, or the like) provided from the external electronic device.

According to an embodiment of the present disclosure, the application 1070 may include an application (e.g., a health care application) which is assigned in accordance with an attribute (e.g., an attribute of a mobile medical device as a kind of electronic device) of the first external electronic device 102 or the second external electronic device 104. The application 1070 may include an application which is received from the server 106, the first external electronic device 102, or the second external electronic device 104. The application 1070 may include a preloaded application or a third party application which is downloadable from a server. The component titles of the program module 1010 according to the embodiment of the present disclosure may be modifiable depending on kinds of OSs.

According to an embodiment of the present disclosure, at least a part of the program module 1010 may be implemented by software, firmware, hardware, or a combination of two or more thereof. At least a part of the program module 1010 may be implemented (e.g., executed), for example, by the processor 910. At least a part of the program module 1010 may include, for example, modules, programs, routines, sets of instructions, or processes, or the like for performing one or more functions.

The term "module", as used herein, may represent, for example, a unit including one or more combinations of hardware, software and firmware. The term "module" may be used interchangeably with the terms "unit", "logic", "logical block", "component" and "circuit". A module may be a minimum unit of an integrated component or may be a part thereof. A module may be a minimum unit for performing one or more functions or a part thereof. A module may be implemented mechanically or electronically. For example, a module may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to embodiments of the present disclosure may be, for example, implemented by instructions stored in a computer-readable storage media in the form of a program module. The instruction, when executed by one or more processors (e.g., a processor 120 in FIG. 3), may cause the one or more processors to perform a function corresponding to the instruction. The computer-readable storage media, for example, may be the memory 130 in FIG. 3.

A computer-readable recording medium may include a hard disk, a magnetic media, a floppy disk, a magnetic media (e.g., a magnetic tape), an optical media (e.g., a compact disc read only memory (CD-ROM) and a digital versatile disc (DVD), a magneto-optical media (e.g., a floptical disk), and hardware devices (e.g., a read only memory (ROM), a random access memory (RAM), or a flash memory). Also, the program instructions may include not only a mechanical code such as things generated by a compiler but also a high-level language code executable on a computer using an interpreter. The above hardware unit may be configured to operate via one or more software modules for performing an operation of the present disclosure, and vice versa.

A module or a program module according to embodiments of the present disclosure may include at least one of the above elements, or a part of the above elements may be omitted, or additional other elements may be further included. Operations performed by a module, a program module, or other elements according to embodiments of the present disclosure may be executed sequentially, in parallel, repeatedly, or in a heuristic method. Also, some operations or portions of operations may be executed in different sequences, omitted, or other operations may be added.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a microphone;
    a speaker; and
    a processor configured to
        receive a voice input of speech of a user via the microphone,
        output content corresponding to the voice input via the speaker, and
        control the speaker to adjust an output speed of the content and/or an output amount of information of the content based on a direction of a rate of movement of the user and a magnitude of the rate of movement, which is obtained from an analysis of the voice input.

2. The electronic device of claim 1, wherein the processor is further configured to determine the rate of movement of the user based on a volume of the speech and to adjust an output volume level of the content based on the rate of movement of the user.

3. The electronic device of claim 1, wherein the processor is further configured to determine the rate of movement of the user based on a volume of the speech which is obtained from an analysis of the voice input, and to adjust the output speed of the content based on the rate of movement of the user.

4. The electronic device of claim 1, wherein the processor is further configured to determine the rate of movement of the user based on a volume of the speech which is obtained from an analysis of the voice input, and to adjust the output amount of information of the content based on the rate of movement of the user.

5. The electronic device of claim 2,
    wherein the processor is further configured to compute a distance between the user and the electronic device, and to determine the rate of movement of the user based on the volume of the speech and a fluctuation of the computed distance.

6. The electronic device of claim 1, wherein the processor is further configured to adjust an output volume level of the content based on a distance between the user and the electronic device.

7. The electronic device of claim 1, wherein the processor is further configured to determine a distance between the user and the electronic device based on a volume of the speech which is obtained from an analysis of the voice input, and to adjust the output speed of the content based on the distance between the user and the electronic device.

8. The electronic device of claim 1, wherein the processor is further configured to determine a distance between the user and the electronic device based on a volume of the speech which is obtained from an analysis of the voice input, and to adjust the output amount of information of the content based on the distance between the user and the electronic device.

9. The electronic device of claim 6,
    wherein the processor is further configured to compute a distance between the user and the electronic device, and to determine the distance between the user and the electronic device based on the volume of the speech and the computed distance.

10. The electronic device of claim 1, wherein the processor is further configured to adjust the output speed of the content based on a speech rate of the speech.

11. The electronic device of claim 1, wherein the processor is further configured to adjust the output amount of information of the content based on a speech rate of the speech.

12. The electronic device of claim 11, wherein the processor is further configured to adjust the output amount of information by extracting and reconfiguring a portion of the content.

13. The electronic device of claim 1, wherein if a designated keyword is included in the speech, the processor is configured to adjust the output speed of the content, and/or the output amount of information of the content.

14. The electronic device of claim 1, wherein the processor is further configured to further determine an emotional status of the user through the analysis of the voice input and to control the speaker to adjust the output speed of the content and/or the output amount of information of the content based on the emotional status of the user.

15. A content providing method of an electronic device, the method comprising:
- receiving a voice input of speech of a user;
- outputting a content corresponding to the voice input; and
- adjusting an output speed of the content and/or an output amount of information of the content based on a direction of a rate of movement of the user and a magnitude of the rate of movement, which is obtained from an analysis of the voice input.

16. The method of claim 15, wherein adjusting the output speed of the content and/or the output amount of information of the content comprises:
- determining the rate of movement of the user based on a volume of the speech which is obtained from an analysis of the voice input; and
- adjusting the output speed of the content, and/or the output amount of information of the content based on the rate of movement of the user.

17. The method of claim 15, wherein adjusting the output speed of the content and/or the output amount of information of the content comprises:
- determining a distance between the user and the electronic device based on a volume of the speech which is obtained from an analysis of the voice input; and
- adjusting the output speed of the content, and/or the output amount of information of the content based on the distance between the user and the electronic device.

18. The method of claim 15, further comprising:
- adjusting an output volume level of the content based on at least one of the rate of movement of the user, the distance between the user and the electronic device, a speech rate of the speech, and a keyword included in the speech.

19. The method of claim 15, wherein if a designated keyword is included in the speech, the adjusting the output speed of the content and/or the output amount of information of the content comprises:
- adjusting the output speed of the content, and/or the output amount of information of the content.

20. A non-transitory computer-readable recording medium having recorded thereon instruction, the instruction, which is executed by at least one processor, causing the at least one processor to:
- obtain a voice input of speech of a user;
- output a content corresponding to the voice input; and
- adjust an output speed of the content and/or an output amount of information of the content based on a direction of a rate of movement of the user and a magnitude of the rate of movement, which is obtained from an analysis of the voice input.

* * * * *